(12) United States Patent
Lemke (10) Patent No.: US 7,095,315 B2
(45) Date of Patent: Aug. 22, 2006

(54) COLLISION AVOIDANCE SYSTEM FOR SNOWMOBILES

(76) Inventor: Richard G. Lemke, 2748 Aspen, Sayner, WI (US) 54560

( * ) Notice: Subject to any disclaimer, the term of this patent is extended or adjusted under 35 U.S.C. 154(b) by 193 days.

(21) Appl. No.: 10/787,673

(22) Filed: Feb. 26, 2004

(65) Prior Publication Data

US 2005/0190047 A1   Sep. 1, 2005

(51) Int. Cl.
*B60Q 1/00* (2006.01)

(52) U.S. Cl. ............... 340/435; 340/436; 701/301; 307/10.1

(58) Field of Classification Search ............... 340/903
See application file for complete search history.

(56) References Cited

U.S. PATENT DOCUMENTS

| | | | |
|---|---|---|---|
| 4,528,563 A * | 7/1985 | Takeuchi | ............... 340/903 |
| 5,173,881 A | 12/1992 | Sindle | |
| 5,339,075 A | 8/1994 | Abst et al. | |
| 5,341,344 A | 8/1994 | O'Brien et al. | |
| 5,388,048 A | 2/1995 | Yavnayi et al. | |
| 5,477,461 A | 12/1995 | Waffler et al. | |
| 6,014,601 A | 1/2000 | Gustafson | |
| 6,097,285 A * | 8/2000 | Curtin | ............... 340/436 |
| 6,097,315 A * | 8/2000 | Minter | ............... 340/961 |
| 6,114,951 A | 9/2000 | Kinoshita et al. | |
| 6,326,887 B1 * | 12/2001 | Winner et al. | ............... 340/435 |
| 6,405,132 B1 | 6/2002 | Breed et al. | |
| 6,408,247 B1 | 6/2002 | Ichikawa et al. | |
| 6,553,130 B1 | 4/2003 | Lemelson et al. | |
| 6,594,614 B1 * | 7/2003 | Studt et al. | ............... 702/150 |
| 6,859,144 B1 * | 2/2005 | Newman et al. | ............... 340/576 |
| 6,876,298 B1 * | 4/2005 | Litkouhi et al. | ............... 340/435 |

* cited by examiner

*Primary Examiner*—Daniel Wu
*Assistant Examiner*—George Bugg
(74) *Attorney, Agent, or Firm*—Dale J. Ream (57) ABSTRACT

A collision avoidance system for snowmobiles includes an array of sensors positioned on a front side of the snowmobile for detecting the presence and location of an approaching obstacle. The sensors include both heat sensors and speed sensors. A control unit is provided for processing signals received from the sensors and outputting audio signals indicative of the detected location of the approaching obstacle. A wireless transmitter transmits the audio signals to a receiver and speaker system contained in a headset or helmet. The speaker system includes left and right speakers contained in the headset or helmet which are adapted to be positioned near or within the driver's left and right ears and provide audible warnings to the driver. The control unit varies a loudness of the audible warnings in the left and right speakers to indicate a direction from which the detected obstacle is approaching.

18 Claims, 6 Drawing Sheets

COLLISION AVOIDANCE SYSTEM FOR SNOWMOBILES

BACKGROUND OF THE INVENTION

1. Field of the Invention

The present invention relates generally to systems for detecting obstacles and avoiding collisions. In particular, the present invention relates to an obstacle detection and collision avoidance system that uses audible alerts to warn a driver of an approaching obstacle.

2. Description of the Related Art

The Consumer Product Safety Commission estimates that each year about 110 people in the United States die while riding snowmobiles, and 13,400 others seek hospital treatment for injuries sustained in snowmobile accidents. Approximately two-fifths of snowmobile-related deaths occur when drivers collide with trees, wires, bridges, and especially other snowmobiles. There is a great need in the industry for a product to reduce the number of snowmobile accidents.

Snowmobile designers offer many safety features, including protective windshields, body and frame designs for protecting crash victims, improved braking systems, and emergency kill systems. However, little has been done in the area of collision avoidance systems suitable for use by snowmobiles and other off-road vehicles.

Vehicle guidance and collision detection systems have been developed for automobiles, as well as military defense systems, avionics systems, and space exploration systems. However, this technology is costly and has not been commercialized in a manner suitable for snowmobiles.

Several prior art patents disclose collision avoidance systems for use with automobiles. Among these systems are computer-controlled systems that process signals from various types of object sensors to determine a safe following distance for the host vehicle to avoid a collision. Other prior art systems include inputs from steering sensors to determine which obstructions are in the projected path of travel of the host vehicle. Still other systems use multiple sensors positioned around the vehicle and/or other inputs, such as GPS, to provide additional information for avoiding collisions. Examples of such prior art systems are briefly described below.

Kinoshita et al. (U.S. Pat. No. 6,114,951) disclose a vehicle collision preventing apparatus that uses an image processor and a computer for calculating inter-vehicle distance to observe and maintain a safe following distance behind another vehicle traveling in the same direction.

Yavnayi et al. (U.S. Pat. No. 5,388,048) disclose a vehicle anti-collision device that uses a laser range-finder mounted near the windshield of the host vehicle to determine the distance and closing velocity of a leading vehicle. A safe following distance is then calculated based on information from the laser range-finder and a determined self-speed of the host vehicle.

Gustafson (U.S. Pat. No. 6,014,601) discloses a driver alert system that uses a laser transmitter to transmit a laser beam at an object, and a laser receiver to receive a reflection of the laser beam. A processing unit calculates the relative speed of the object using information from the vehicle speedometer system, and also calculates a distance from the object and a relative acceleration of the object with respect to the vehicle. The system uses a linear light system to display the level of safety or danger.

Waffler et al. (U.S. Pat. No. 5,477,461) disclose a method for avoiding collisions of a motor vehicle with an obstacle that uses a plurality of scanning beams emitted fanwise in and beside the motion path of the vehicle. The output from the scanning beams is fed to an evaluation unit along with a steering angle signal to determine which obstacles pose a danger in the projected path of the vehicle.

O'Brien et al. (U.S. Pat. No. 5,341,344) disclose an obstacle-detection system in which a plurality of microwave-transceiver sensors are positioned around the vehicle. The signals reflected from objects around the vehicle are processed by a control unit, and an alarm is sounded if a detected object is determined to be a threat to the vehicle.

Abst et al. (U.S. Pat. No. 5,339,075) disclose a vehicular collision avoidance apparatus that uses an ultrasonic transmitter/receiver to detect when there is a threat of changing lanes into the path of another vehicle. The device is activated by the turn signal indicator control of the host vehicle and emits an audible warning signal with a frequency related to a degree of threat from the other vehicle.

Sindle (U.S. Pat. No. 5,173,881) discloses a vehicular proximity sensing system in which a plurality of ultrasonic distance-detector devices are disposed around a vehicle's periphery. A simulated vehicle display is provided on the dashboard to alert the diver to the close approach of an external object.

Lemelson et al. (U.S. Pat. No. 6,553,130) disclose a motor vehicle warning system that uses a TV camera mounted on the vehicle and an image processor to analyze the video images and identify obstacles. A warning means is used to warn the driver of approaching and existing hazards.

Ichikawa et al. (U.S. Pat. No. 6,408,247) disclose an obstacle detecting system that uses output from a radar device and information from wheel speed sensors and a yaw rate sensor to determine whether a detected obstacle is a collision threat.

Breed et al. (U.S. Pat. No. 6,405,132) disclose an accident avoidance system that uses GPS ranging signals to monitor the positions of vehicles and approaching dangers on a roadway. This system relies primarily on stored information of roadway lane and boundary locations and information received by GPS from other vehicles on the road to determine when dangers are approaching. Breed et al. also use a radar system and/or a laser radar for detecting vehicles and other hazards that are not equipped with a GPS transmitter.

The conventional collision avoidance systems described above are not suitable for use with snowmobiles and other off-road vehicles because they are generally too complicated, they fail to discriminate between obstacles that pose a real danger threat and obstacles that pose little or no danger, and/or they are not equipped with a suitable interface for alerting the driver of an approaching danger. Thus, there is a need in the industry for an improved collision avoidance system suitable for use with snowmobiles and other off-road vehicles.

SUMMARY OF THE INVENTION

An object of the present invention is to provide a collision avoidance system for snowmobiles and other off-road vehicles that overcomes the problems and limitations of the prior art systems described above.

A further object of the present invention is to provide a collision avoidance system for snowmobiles that has a physical range long enough to provide warning of an impending collision early enough for the driver to take useful action.

A further object of the present invention is to provide a collision avoidance system for snowmobiles that minimizes "false alarms" and attempts to warn the driver only in truly dangerous situations.

A still further object of the present invention is to provide a collision avoidance system for snowmobiles that is inexpensive, lightweight, and physically attractive to minimize its impact on the snowmobile's appearance and performance.

In order to accomplish these and other objects of the invention, a collision avoidance system for snowmobiles is provided that includes an array of sensors positioned on a front side of the snowmobile for detecting the presence and location of an approaching obstacle. The sensors include both heat sensors and speed sensors. A control unit is provided for processing signals received from the sensors and outputting audio signals indicative of the detected location of the approaching obstacle. A wireless transmitter transmits the audio signals to a receiver and speaker system contained in a headset or helmet. The speaker system includes left and right speakers contained in the headset or helmet which are adapted to be positioned near or within the driver's left and right ears and provide audible warnings to the driver. The control unit varies a loudness of the audible warnings in the left and right speakers to indicate a direction from which the detected obstacle is approaching.

According to a broad aspect of the present invention, a collision avoidance system for a vehicle is provided, comprising: a plurality of sensors for detecting the presence of approaching obstacles in a plurality of danger zones; a control unit for processing signals received from the sensors; and an interface for providing an audible warning to a driver that an approaching obstacle has been detected by one or more of the sensors. The control unit has a means for changing the audible warning to indicate to the driver in which zone the approaching obstacle is located.

According to another broad aspect of the present invention, a collision avoidance system for snowmobiles is provided, comprising: a sensor means for detecting the presence and location of an approaching obstacle; a speaker means for providing an audible warning to a driver that an approaching obstacle has been detected, the speaker system comprising left and right speakers adapted to be positioned near or within the driver's left and right ears, respectively; and a control means for evaluating signals received from the sensor means and outputting audio signals to the speaker means which vary depending on the detected location of the approaching obstacle.

According to another broad aspect of the present invention, a snowmobile equipped with a collision avoidance system is provided, comprising: an array of sensors positioned on a front side of the snowmobile, the sensors being arranged for detecting the presence and location of an approaching obstacle; a control unit for processing signals received from the sensors and outputting audio signals indicative of the detected location of the approaching obstacle; and a speaker system that receives the audio signals from the control unit for providing an audible warning to a driver.

Numerous other objects of the present invention will be apparent to those skilled in this art from the following description wherein there is shown and described a preferred embodiment of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A collision avoidance system for snowmobiles according to a preferred embodiment of the present invention will now be described in detail with reference to FIGS. 1 to 6 of the drawings.

Figure 1:
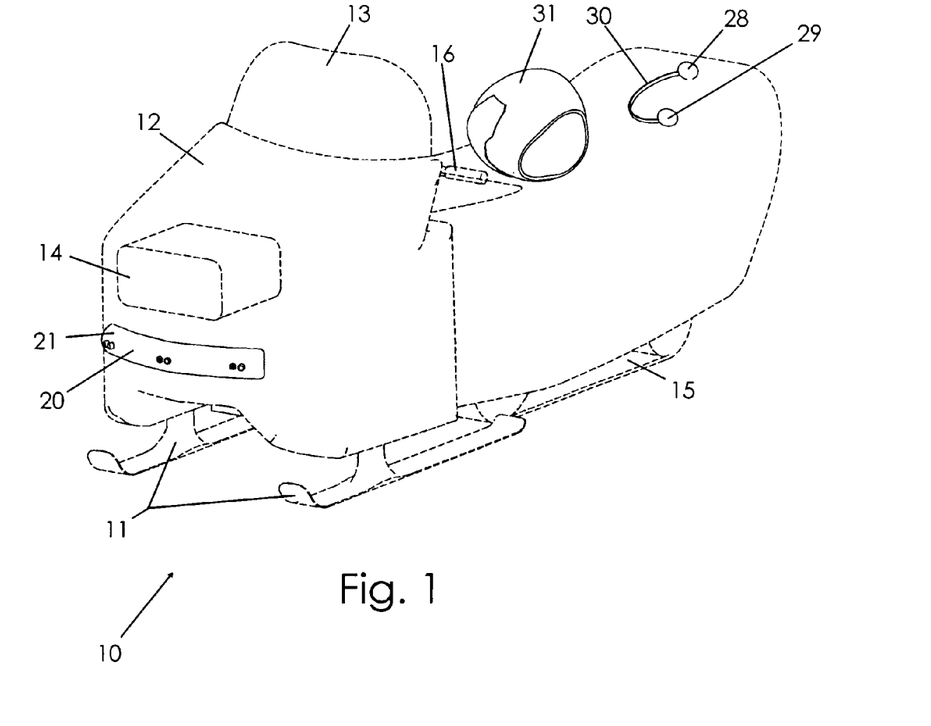
FIG. 1 is a perspective view of a snowmobile equipped with a collision avoidance system according to the present invention.

A snowmobile equipped with the collision avoidance system of the present invention is depicted in FIG. 1 at reference numeral 10. The snowmobile 10 is representative of several commercially available snowmobiles generally. It includes a pair of front skis 11, a hood cowl 12, a windscreen 13, a headlight 14, a drive track 15, and various other components that are not shown specifically in the drawings, such as an occupant seat, a drive track suspension, a chassis, running boards, and a taillight. The cowl 12 normally covers an internal combustion engine, although any suitable power source may be used. To the rear of the cowl 12, the occupant seat is mounted on the chassis. The running boards are provided on each side of the chassis for receiving the feet of the rider or riders. At the rear end of the seat, there is typically a luggage or cargo compartment. A handlebar 16 with a throttle and/or brake assembly is provided to control the snowmobile 10.

The present invention is a collision avoidance system 20 that can be mounted on, or integrated into, the conventional snowmobile 10. The system 20 includes an array of sensors A, B, C mounted on a sensor strip 21 attached as a unit to a front side of the cowl 12 of the snowmobile 10. The sensor strip 21 can be made longer so as to wrap more completely around the front of the snowmobile 10 for better lines of sight to the left and right. Alternatively, the sensors A, B, C can be integrated into or mounted directly on the cowl 12, particularly when the system 20 is integrated into the snowmobile 10 as original equipment. The sensors A, B, C are used to detect the presence and location of approaching obstacles, as explained below.

To operate effectively, the collision avoidance system 20 must sense an object's distance or speed, make a judgment on the likelihood that this object presents a danger to the driver, and warn the driver to take evasive action. There are many types of sensors that can accomplish this goal. Most use the wave properties of sound, light, or other EM radiation (radar, infrared, etc.) to sense objects. For example, in proximity sensors, a "ping" of sound or EM radiation is sent out. These waves spread out from their source, losing intensity as they spread. If the waves strike an object, they are reflected back towards the source. A sensor can then receive the signal, and indicate to the user that an obstacle is present.

Because waves spread out in all directions, it is difficult to tell from which direction the signal is reflected, By using multiple transmitters and sensors in a split beam arrangement, more information about the obstacle's position can be determined. For example, if only a left sensor detects an object, the system can conclude that it is somewhere to the left of center. Beam splitting is used by the present invention to get maximum resolution with the minimum sensor array complexity.

Knowing an object is present is sometimes not enough. More often, the snowmobiler will be interested in the relative speed of an object, which can be used to detect objects that are approaching the host vehicle 10 and thereby creating an eminent danger of collision. There are many ways to compute speed, two of which are numerical differentiation and Doppler shift measurement. These techniques can be employed with various types of media, including sound and EM radiation.

In addition to sensing objects that are approaching the host vehicle 10, the collision avoidance system 20 also uses sensors that detect the presence of warm objects. Such sensors are normally referred to as passive infrared sensors, which detect the amount of infrared being radiated by objects. Hot objects radiate differently than cooler objects, and passive infrared sensors can recognize these differences. In the cold environment that snowmobiles can be expected to operate in, human bodies and engine exhaust will stand out as very hot objects. The most common types of passive infrared sensors are pyroelectric sensors.

In the preferred embodiment, three pairs of sensors A, B, C are arranged along the sensor strip 21. Each sensor pair A, B, C includes a pyroelectric heat sensor 22 and an ultrasonic speed sensor 23. The pyroelectric heat sensors 22 are configured to detect the presence of warm objects, such as people, animals or other vehicles. The ultrasonic speed sensors 23 are configured to only detect objects moving toward the snowmobile 10. By using both pyroelectric heat sensors 22 and ultrasonic speed sensors 23, the system 20 can determine when warm objects, such as people, animals or other vehicles, are approaching the snowmobile 10, thereby limiting the danger warnings to situations in which a high probability of a true danger exists.

A mode switch (not shown) can be provided so that each type of sensor 22, 23 can be used independently. For example, if the driver desires to be warned of all approaching objects (and not just warm objects), the mode switch can be set so that the system 20 warns of all approaching objects detected by the ultrasonic speed sensors 23. On the other hand, if the driver desires to be warned of all warm objects in the immediate vicinity of the snowmobile 10 (whether or not such objects are approaching the snowmobile), the mode switch can be set so that the system 20 warns of all warm objects detected by the pyroelectric heat sensors 22.

Figure 3:
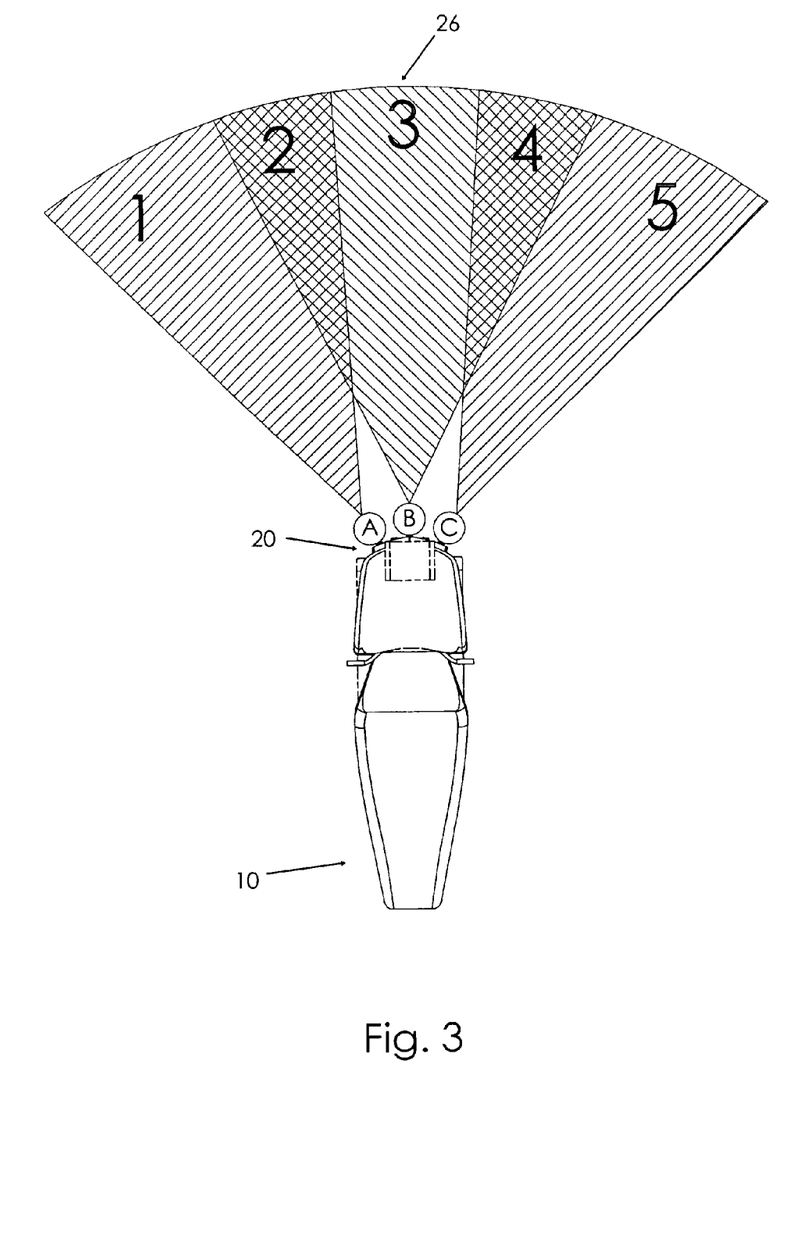
FIG. 3 is a plan view of a snowmobile equipped with the collision avoidance system of the present invention and showing the multiple danger zones monitored by the sensors.

The sensors A, B, C are arranged to detect approaching obstacles in a plurality of danger zones 1–5 using a beam splitting arrangement and logic circuit 24 in the control unit 25, as explained below. In the preferred embodiment, the danger zones 1–5 include five zones arranged from left to right across a forward-looking danger detecting area 26. The danger zones include a first zone 1 at a left portion of the detecting area, a second zone 2 at a front left portion, a third zone 3 at a front center portion, a fourth zone 4 at a front right portion, and a fifth zone 5 at a right portion. Additional danger zones (not shown) can be monitored by positioning additional sensors at the sides or rear of the snowmobile 10.

As shown in FIG. 3, the first pair A of heat and speed sensors are arranged to detect approaching danger in the first and second zones 1, 2. The second pair B of heat and speed sensors are arranged to detect approaching danger in the second, third and fourth zones 2–4. The third pair C of heat and speed sensors are arranged to detect approaching danger in the fourth and fifth zones 4, 5. The second zone 2 is defined by an area of overlap covered by both the first and second pairs A, B of sensors, while the fourth zone 4 is defined by an area of overlap covered by both the second and third pairs B, C of sensors.

Figure 4:
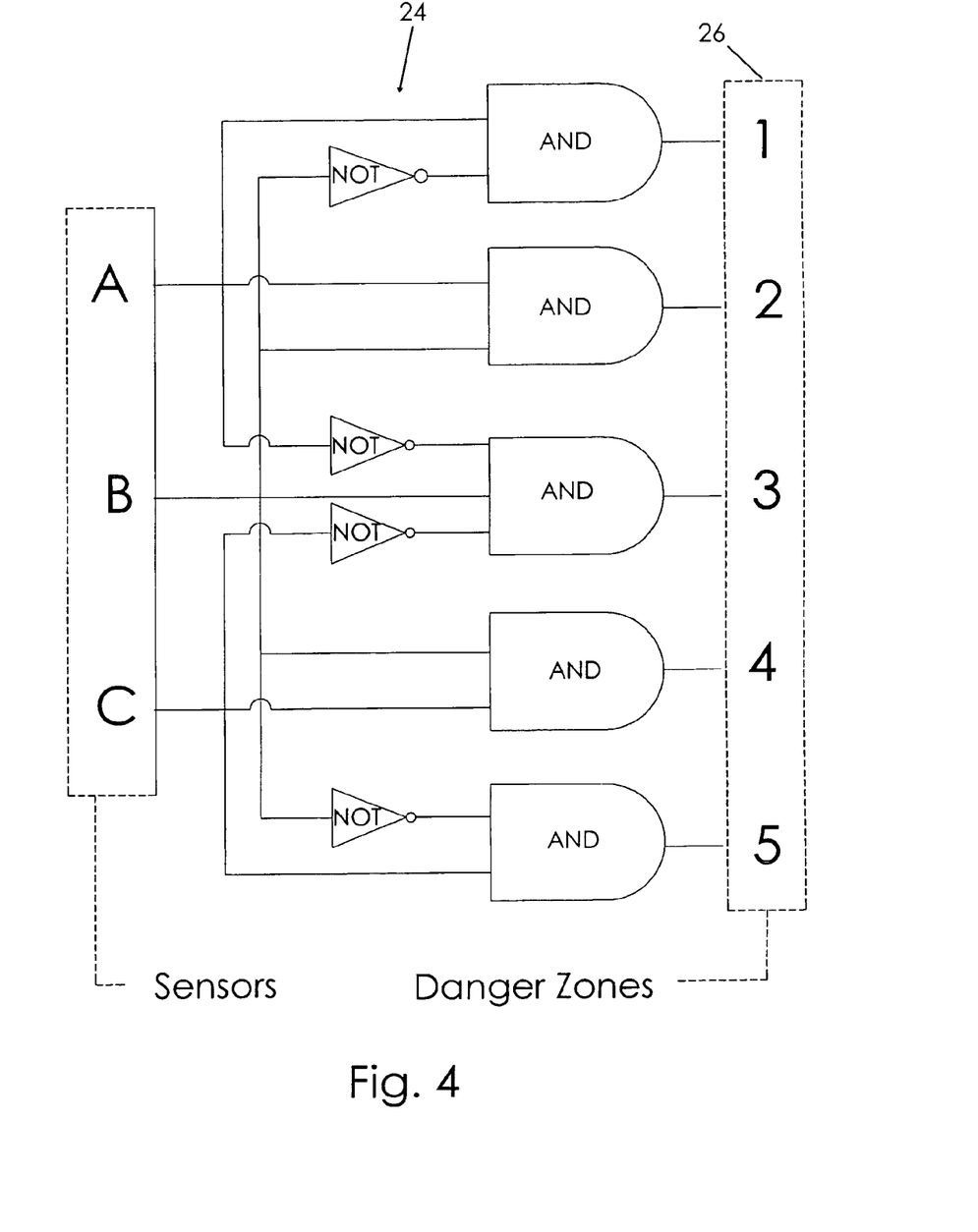
FIG. 4 is a logic diagram illustrating the logic used to monitor five danger zones using three sensor pairs.

The control unit 25 is provided for processing signals received from the heat and speed sensors 22, 23. The control unit 25 includes a logic circuit 24, which is depicted in FIG. 4 using AND and NOT gates, for determining in which zone an approaching obstacle is located based on which of the first, second and third pairs A–C of heat and speed sensors detect the approaching danger. When only the first pair of sensors A detect an approaching obstacle, the logic circuit 24 determines that the approaching obstacle is located in the first zone 1. When both the first and second pairs of sensors A, B detect an approaching obstacle, the logic circuit 24 determines that the approaching obstacle is located in the second zone 2. When only the second pair of sensors B detect an approaching obstacle, the logic circuit 24 determines that the approaching obstacle is located in the third zone 3. When both the second and third pairs of sensors B, C detect an approaching obstacle, the logic circuit 24 determines that the approaching obstacle is located in the fourth zone 4. When only the third pair of sensors C detect an approaching obstacle, the logic circuit 24 determines that the approaching obstacle is located in the fifth zone 5.

An interface 27 between the control unit 25 and the driver provides a warning to the driver that an approaching obstacle has been detected on one or more of the sensors A–C. While an automotive system can cause a light on the dash to flash, snowmobile operators must be constantly aware of the environment and do not spend a great deal of time looking at their instruments. Similarly, a warning tone can be used in a car, but the necessarily thick helmet required for protection and warmth would muffle all but the loudest sounds on a snowmobile. For these reasons, an important consideration of the present invention is providing an interface 27 that gives the snowmobile driver the fastest possible warning without diverting his or her attention from the trail. Instead of drawing the driver's attention to the warning signal, the device should ideally draw attention to the danger.

The interface 27 of the present invention sounds a warning tone (within the helmet) in such a way as to indicate the direction of the dangerous obstacle. For example, if an obstacle is perceived to the left of the snowmobile's present course, a tone will sound more loudly in the driver's left ear than the right. The driver's natural tendency is to interpret this as a single sound coming from the left and instinctively turn the head in that direction. This will enable the driver to be alerted in the first few critical seconds in which evasive action can still be taken.

The interface 27 preferably includes a first speaker 28 positioned near or within the driver's left ear, and a second speaker 29 positioned near or within the driver's right ear.

Figure 2:
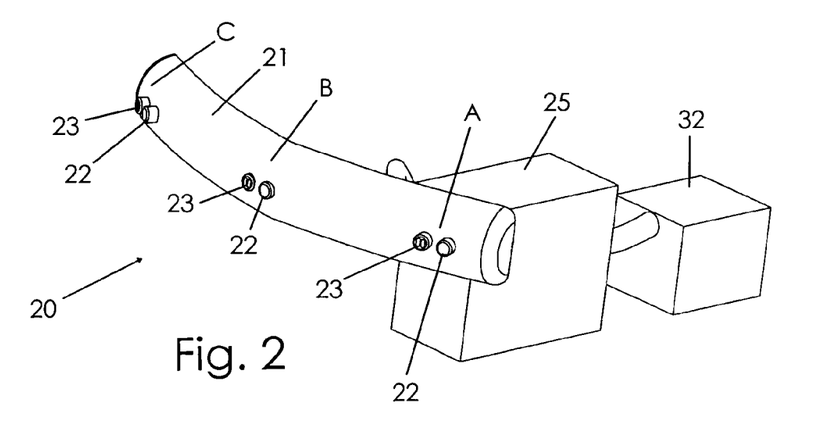
FIG. 2 is a perspective view of the collision avoidance system according to the present invention.

The speakers 28, 29 can be contained within a headset 30, as shown in FIG. 1, or they can be integrated within a protective helmet 31, as shown in FIG. 2. The speakers 28, 29 can also be combined with a conventional radio communication set used for motorcycles and ATVs, which have suitable ear pieces positioned near or within the driver's ears without interfering with the fit of the helmet.

Figure 6:
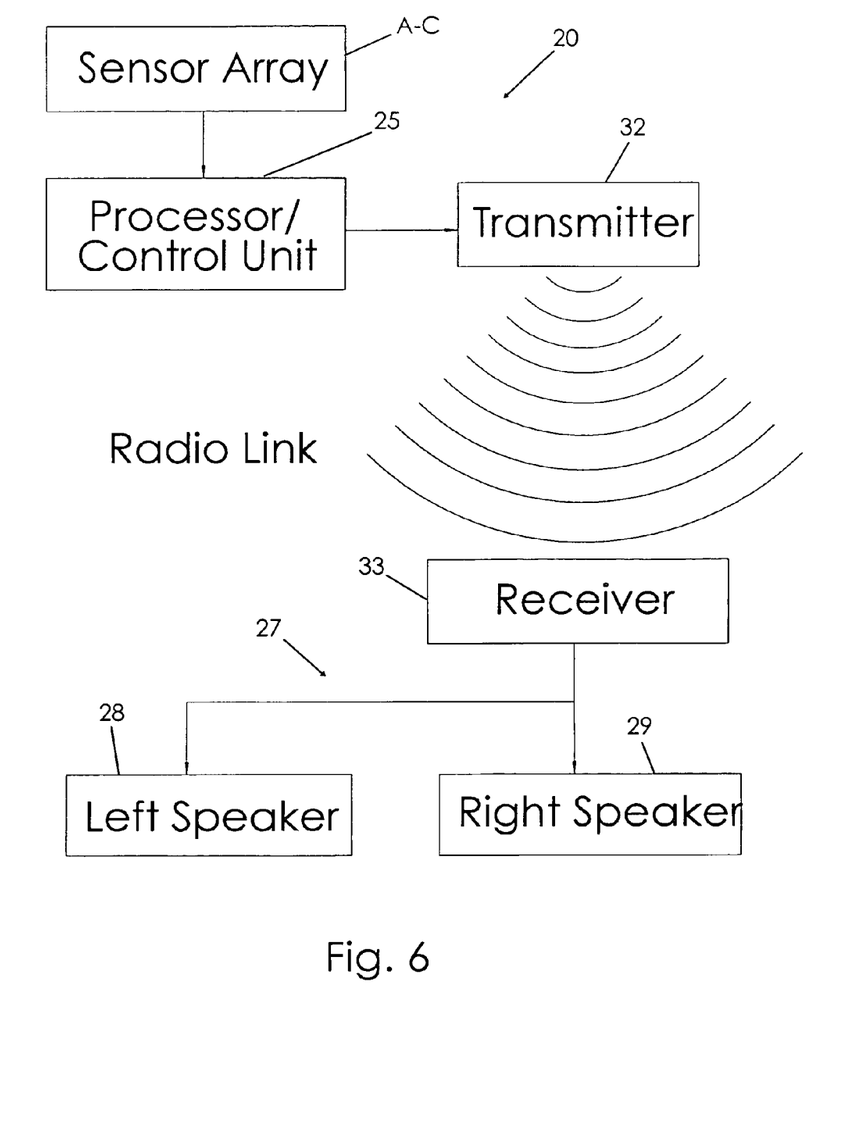
FIG. 6 is a block diagram showing the components of the collision avoidance system.

The speakers 28, 29 receive audio signals from the control unit 25 via a radio transmitter 32 connected to the control unit 25 and a corresponding receiver 33 connected to the speakers 28, 29. A battery (not shown) supplies power to operate the receiver 33 and speakers 28, 29. This arrangement provides a wireless communication between the control unit 25 and the speakers 28, 29, thereby avoiding the inconvenience of a wire running from the speakers to the control unit.

In operation, the control unit 25 outputs audio signals to the transmitter 32, which are transmitted to and received by the receiver 33, and then played on the speakers to indicate the presence and location of the approaching obstacle. As explained above, the logic circuit 24 of the control unit 25 determines in which zone 1–5 the approaching obstacle is located and outputs an audio signal indicative of that particular zone. That is, the audio signals vary depending on the zone in which an approaching obstacle is located.

In the case of five danger zones 1–5, the logic circuit 24 of the control unit 25 causes an audible warning tone to sound loudly in only the first (left) speaker 28 to indicate an approaching obstacle located in the first (left) zone 1. Similarly, the logic circuit 24 causes an audible warning tone to sound loudly in only the second (right) speaker 29 to indicate an approaching obstacle located in the fifth (right) zone 5. The logic circuit 24 causes an audible warning tone to sound loudly in both the first and second speakers 28, 29 to indicate an approaching obstacle located in the third (center) zone 3. Approaching objects in the second (left center) zone 2 and fourth (right center) zone 4 are identified by causing an audible warning tone to sound relatively loudly in one speaker and relatively softly in the other speaker. Such audible warning tones provide an intuitive warning to the driver who has a natural tendency to look in the direction of the warning tone.

Figure 5:
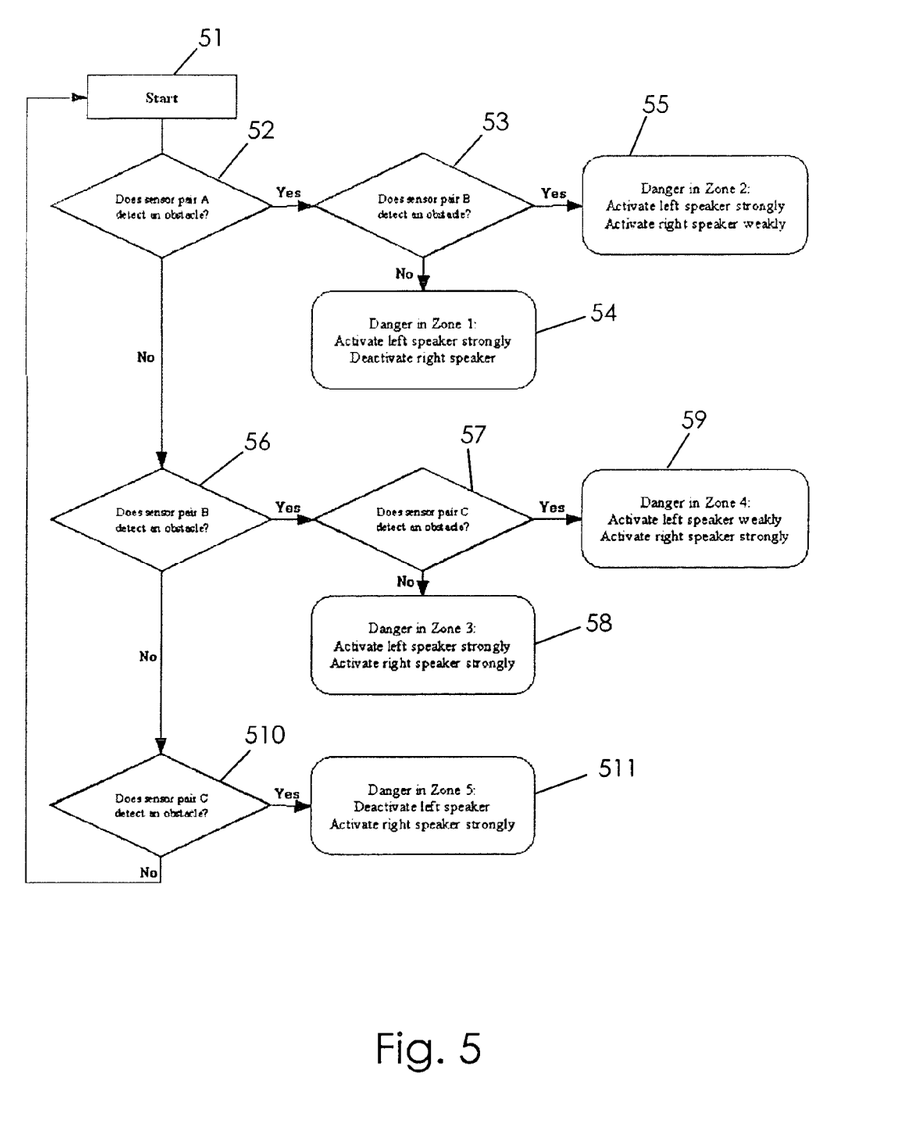
FIG. 5 is a flow chart explaining the operation of the collision avoidance system.

The processing steps of the logic circuit 24 of the control unit 25 are shown in the flowchart of FIG. 5. The beginning or "Start" of the process is shown as step S1. The process determines in step S2 whether the first sensor pair A detects an approaching obstacle. If so, the process proceeds to steps S3 to S5. If not, the process is directed to step S6.

In process step S3 the process determines whether the second sensor pair B detects the obstacle. If not, the process goes to step S4 and the control unit 25 determines that the approaching obstacle is located in the first (left) danger zone 1. The control unit 25 then outputs a signal that activates the left speaker 28 strongly and deactivates the right speaker 29.

If the second sensor pair B does detect an obstacle in process step S3, the process goes to step S5 and the control unit 25 determines that the approaching obstacle is located in the second danger zone. The control unit 25 then outputs a signal that activates the left speaker 28 strongly and the right speaker 29 weakly to indicate to the driver the general location of the approaching obstacle in the second danger zone 2.

If the first sensor pair A does not detect an obstacle in process step S2, the process goes to step S6 and the process determines whether the second sensor pair B detects an approaching obstacle. If so, the process proceeds to steps S7 to S9. If not, the process is directed to step S10.

In process step S7 the process determines whether the third sensor pair C detects the approaching obstacle. If not, the process goes to step S8, and the control unit 25 determines that the approaching obstacle is located in the third (center) danger zone 3. The control unit 25 then outputs a signal that activates both the left and right speakers 28, 29 strongly to indicate to the driver the general location of the approaching obstacle in the third danger zone 3.

If the third sensor pair C does detect an obstacle in process step S7, the process goes to step S9, and the control unit 25 determines that the approaching obstacle is located in the fourth (right center) danger zone 4. The control unit 25 then outputs a signal that activates the left speaker 28 weakly and the right speaker 29 strongly to indicate to the driver the general location of the approaching obstacle in the fourth danger zone 4.

If the second sensor pair B does not detect an obstacle in process step S6, the process goes to step S10 and the process determines whether the third sensor pair C detects an approaching obstacle. If so, the process goes to step S11, and the control unit 25 determines that the approaching obstacle is located in the fifth (right) danger zone 5. The control unit 25 then outputs a signal that deactivates the left speaker 28 and activates the right speaker 29 strongly to indicate to the driver the general location of the approaching obstacle in the fifth danger zone 5. If the third sensor pair C does not detect an approaching obstacle in step S10, the process returns to the first step S1, and the process is repeated.

As explained above, the preferred embodiment of the present invention includes a single array of sensors A–C positioned at the front of the snowmobile 10 in a forward looking arrangement. It will be appreciated that additional sensors (not shown) can be placed on the sides and/or the rear of the snowmobile 10 to provide further warnings to the driver of impending collisions from these directions. While such additional sensors might provide more accuracy in some circumstances, they will also entail more control circuitry, draw more power, and increase the expense of the system.

The present invention provides a collision avoidance system 20 that is particularly suitable for snowmobiles and other off-road vehicles, such as ATVs. The unpredictable landscape in which snowmobiles are operated poses some unique challenges that must be overcome to provide a useful system. Alone, most sensors are unable to make sense of an area cluttered with obstacles. However, by combining two sensor types that complement each other, truly dangerous situations can be easily recognized and avoided. Finally, a unique interface 27 with the operator makes the present invention seamless and intuitive. Warning tones in the protective helmet 31 eliminate the need to constantly observe the dash, which would divert attention from the trail. Stereo sound makes use of human reflexes, drawing immediate attention to the direction of the danger.

While the invention has been specifically described in connection with specific embodiments thereof, it is to be understood that this is by way of illustration and not of limitation, and the scope of the appended claims should be construed as broadly as the prior art will permit.

Having thus described the invention, what is claimed as new and desired to be secured by Letters Patent is as follows:

1. A collision avoidance system for a vehicle, comprising:
a plurality of sensors for detecting the presence of approaching obstacles in a plurality of danger zones;
wherein said plurality of sensors comprise a plurality of sensor pairs arranged for detecting approaching objects in said danger zones, and wherein each sensor pair comprises a pyroelectric heat sensor and an ultrasonic speed sensor;

a control unit for processing signals received from the sensors;

an interface for providing an audible warning to a driver that an approaching obstacle has been detected by one or more of said sensors; and said control unit having a means for changing the audible warning to indicate to the driver in which zone the approaching obstacle is located.

2. The collision avoidance system according to claim 1, wherein said interface comprises a first speaker adapted to be positioned near a driver's left ear and a second speaker adapted to be positioned near a driver's right car.

3. The collision avoidance system according to claim 2, wherein said first and second speakers are arranged on a headset.

4. The collision avoidance system according to claim 2, wherein said first and second speakers are integrated into a protective helmet.

5. The collision avoidance system according to claim 2, further comprising a transmitter connected to the control unit for transmitting signals from the control unit when an approaching danger is detected, and a receiver connected to the speakers for receiving the signals transmitted from said transmitter.

6. The collision avoidance system according to claim 1, wherein said plurality of sensors comprise a combination of heat sensors and speed sensors.

7. The collision avoidance system according to claim 1, wherein said plurality of sensors comprise at least one pyroelectric heat sensor for detecting the presence of people or vehicles.

8. The collision avoidance system according to claim 7, wherein said plurality of sensors comprise at least one ultrasonic speed sensor for detecting objects moving toward the vehicle.

9. The collision avoidance system according to claim 1, wherein said control unit includes a logic circuit means for determining in which zone an approaching danger is located and outputting a signal to the interface indicative of said zone.

10. The collision avoidance system according to claim 1, wherein said danger zones comprise five zones arranged from left to right across a danger detecting area, said danger zones including a first zone at a left portion of the detecting area, a second zone at a front left portion, a third zone at a front center portion, a fourth zone at a front right portion, and a fifth zone at a right portion.

11. The collision avoidance system according to claim 10, wherein said plurality of sensors comprise a first pair of heat and speed sensors arranged to detect approaching danger in at least the first and second zones, a second pair of heat and speed sensors ranged to detect approaching danger in at least the second, third and fourth zones, and a third pair of heat and speed sensors arranged to detect approaching danger in at least the fourth and fifth zones.

12. The collision avoidance system according to claim 11, wherein said second zone is defined by an area of overlap covered by both the first and second pairs of sensors, and said fourth zone is defined by an area of overlap covered by both the second and third pairs of sensors.

13. The collision avoidance system according to claim 12, wherein said control unit includes a logic circuit means for determining in which zone an approaching obstacle is located based on which of the first, second and third pairs of heat and speed sensors detect the approaching danger.

14. The collision avoidance system according to claim 1, wherein said interface comprises a first speaker adapted to be positioned near a driver's left ear and a second speaker adapted to be positioned near a driver's right ear, and said means for changing the audible warning causes audio signals to be sent to the first and second speakers that vary depending on the zone in which an approaching danger is located.

15. The collision avoidance system according to claim 14, wherein said means for changing the audible warning causes an audible warning tone to sound more loudly in the first speaker than in the second speaker to indicate an approaching danger located in a danger zone on a left side of a center danger zone, to sound approximately the same in both the first and second speakers to indicate an approaching danger located in the center danger zone, and to sound more loudly in the second speaker than in the first speaker to indicate an approaching danger located in a danger zone on a right side of the center danger zone.

16. The collision avoidance system according to claim 15, wherein said means for changing the audible warning causes an audible warning tone to sound relatively loudly in the first speaker and relatively softly in the second speaker to indicate an approaching danger located immediately left of the center danger zone, and to sound relatively softly in the first speaker and relatively loudly in the second speaker to indicate an approaching danger located immediately right of the center danger zone.

17. A snowmobile equipped with a collision avoidance system, a comprising:

an array of sensors positioned on a front side of the snowmobile, the sensors being arranged for detecting the presence and location of an approaching obstacle;

wherein said array of sensors comprise a plurality of sensor pairs arranged for detecting a respective obstacle, and wherein each sensor pair comprises a pyroelectric heat sensor and an ultrasonic speed sensor;

a control unit for processing signals received from the sensors and outputting audio signals indicative of the detected location of the approaching obstacle; and a speaker system that receives said audio signals from the control unit for providing an audible warning to a driver.

18. The snowmobile according to claim 17, wherein said speaker system comprises a first speaker adapted to be positioned near or within a driver's left ear and a second speaker adapted to be positioned near or within a driver's right ear, and said control unit varies a loudness of the audible warnings in the first and second speakers to indicate a direction from which the detected obstacle is approaching.

* * * * *